United States Patent [19]

Pakur et al.

[11] 4,043,371
[45] Aug. 23, 1977

[54] BEAD CORE FOR PNEUMATIC TIRES

[75] Inventors: Henryk Pakur, Buckeburg; Reinhard Tiemann, Hemmingen, both of Germany

[73] Assignee: Continental Gummi-Werke Aktiengesellschaft, Hannover, Germany

[21] Appl. No.: 680,886

[22] Filed: Apr. 27, 1976

[30] Foreign Application Priority Data

Apr. 29, 1975 Germany .............................. 2518934

[51] Int. Cl.² ............................................ B60C 15/04
[52] U.S. Cl. .................................... 152/362 R; 245/1.5
[58] Field of Search ............. 152/362 R, 362 CS, 354, 152/361 R; 245/1.5; 59/35, 78, 80, 82-84

[56] References Cited

U.S. PATENT DOCUMENTS

| 649,720 | 5/1900 | Duryea .................................. 152/358 |
| 708,954 | 9/1902 | Blodgett ........................... 152/358 X |
| 2,140,491 | 12/1938 | Biedermann .............................. 59/80 |
| 2,952,293 | 9/1960 | Billingsly .......................... 245/1.5 X |
| 3,106,952 | 10/1963 | Rudder ............................ 152/362 R |
| 3,973,389 | 8/1976 | Roberts .................................. 59/35 R |

Primary Examiner—Drayton E. Hoffman
Assistant Examiner—Fred A. Silverberg
Attorney, Agent, or Firm—Walter Becker

[57] ABSTRACT

A bead core for pneumatic tires which is composed of wires, cables, cords or similar thread-shaped strength carriers wound to form a plurality of windings. These windings are formed by successive coils or spiral sections of a continuous strength carrier. The bead core furthermore includes one or more additional windings respectively formed by rings closed in themselves.

4 Claims, 2 Drawing Figures

BEAD CORE FOR PNEUMATIC TIRES

The present invention relates to bead cores for pneumatic tires, which bead cores are made up of a plurality of windings of wires, cables, strands or similar thread-shaped strength carriers, according to our co-pending application Ser. No. 655,124, Pakur et al, filed Feb. 4, 1976, said windings of superimposed coils or spirals being formed by continuous strength carriers.

According to our above mentioned patent application, the bead cores are built up without retension of self substance (stoffschlüssige Bindung) between adjacent wire windings, and the connection is realized solely by the build-up of said bead cores. The mechanical interlinking of the individual wire or cable windings introduced for this purpose permits completely to do without the otherwise necessary enveloping material for the mutual adherence of said windings with the result that considerable labor is saved and the overall production costs are considerably reduced.

According to a specific embodiment of the invention set forth in our above mentioned co-pending application. Ser. No. 655,124, the windings of substantially the same size are formed of successive coils or spirals of an uninterrupted continuous wire or cable. Such an arrangement has over the utilization of individual rings closed in themselves the particular advantage that it is merely necessary to provide only a single connection for closing the windings.

The present invention is based on bead cores of the above mentioned type and has as its object a further improvement with regard to holding the windings together at high precision with regard to the circular shape and the dimensions in the finished condition of the bead cores.

This object and other objects and advantages of the invention will appear more clearly from the following specification in connection with the accompanying drawing diagrammatically illustrating the making of a bead core according to the present invention.

More specifically, according to the present invention one or more additional windings are employed which are formed of rings closed in themselves. These additional rings may consist of continuous strength carriers of the same or similar material as the coil made of a continuous wire closed in itself or they may consist of a material which clearly differs from said coil, and may also have a different cross section. According to a preferred embodiment of the invention, the additional windings have over the coil of the continuous strength carrier a higher strength and/or greater cross section dimensions. The present invention retains all of the advantages mentioned in connection with the subject matter of our above co-pending patent Application Ser. No. 655,124 filed Feb. 4, 1976. In addition thereto, the bead core built up in conformity with the present invention represents a further improvement of the bead core with regard to the manufacturing precision thereof and also with regard to its behavior in mounted condition. For all practical purposes, the present invention represents a combination of the two individual possibilities of a mutual interlinking of the individual windings and reduces the manufacturing costs relative to the so-called "cable cores" and other constructions.

Figure 1:
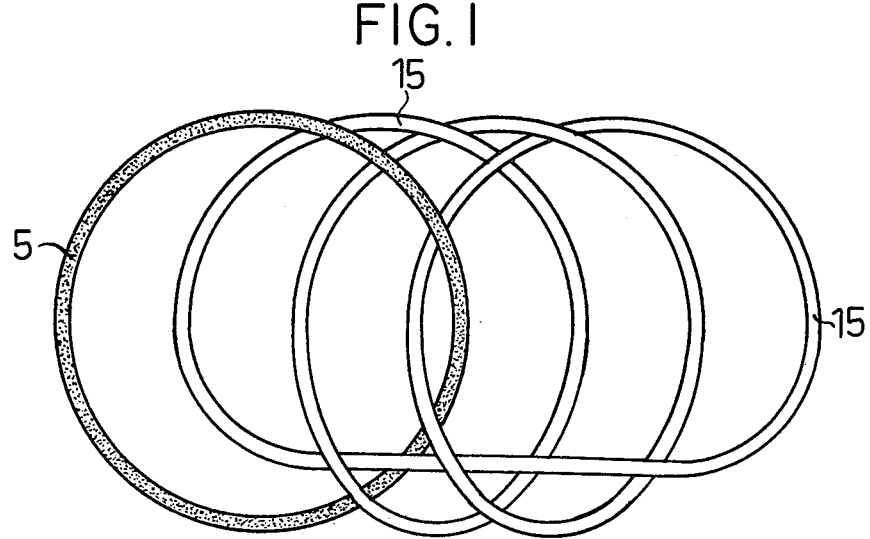
FIG. 1 shows a bead core ring with windings forming a strength carrier.
Figure 2:
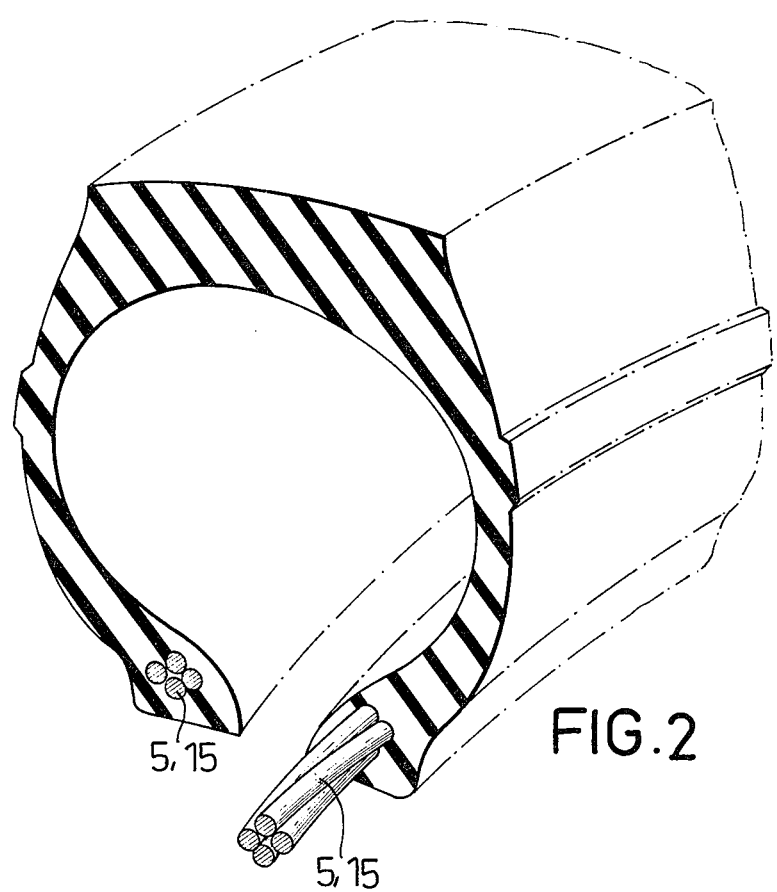
FIG. 2 shows a tire having a bead core of the present invention installed therewith.

Referring now to the drawings in detail, the drawing of FIG. 1 shows a core ring in a condition in which for better recognizing the course of the wire, the individual windings or spirals are pulled apart. The core consists of a closed ring 5 made of a steel wire or another non-metallic strength carrier. Wound upon said ring 5 is a steel wire or any other strength carrier in the form of a plurality of interengaging windings 15 made endless by connecting the ends of the strength carrier. The loosely wound structure represents in its final condition a compacted ring which can then be installed into the annular bead of a pneumatic tire as shown in FIG. 2.

It is, of course, to be understood that the present invention is, by no means, limited to the specific showing in the drawing, but also comprises any modifications within the scope of the appended claims.

What we claim is:

1. A tire having a bead core composed of thread-shaped strength carrier means closed in a looped manner and comprising a plurality of windings interlocking with each other to form the strength carrier means having as an improvement in combination therewith at least one annular member separately closed in itself and comprising winding ring means interlocked with said strength carrier means to fix the peripheral diameter by holding the windings together with a high degree of precision with regard to the circular shape and dimension of the finished condition of the bead core.

2. A tire having a bead core in combination according to claim 1, in which said annular member is of the same material as the material of said strength carrier means.

3. A tire having a bead core in combination according to claim 1, in which said annular member is of a material having at least approximately the same strength as said strength carrier means.

4. A tire having bead core in combination according to claim 1, in which said at least one additional winding consists of a material different from the material of said strength carrier.

* * * * *